(12) United States Patent
Kimura et al.

(10) Patent No.: US 11,164,057 B2
(45) Date of Patent: Nov. 2, 2021

(54) VISIBLE IMAGE UNIT IDENTIFICATION CODE STRUCTURE

(71) Applicant: BURTON INC., Kawasaki (JP)

(72) Inventors: Hidei Kimura, Kawasaki (JP); Masayuki Momiuchi, Kawasaki (JP)

(73) Assignee: BURTON INC., Kawasaki (JP)

( * ) Notice: Subject to any disclaimer, the term of this patent is extended or adjusted under 35 U.S.C. 154(b) by 468 days.

(21) Appl. No.: 16/330,565

(22) PCT Filed: Sep. 6, 2016

(86) PCT No.: PCT/JP2016/076216
§ 371 (c)(1),
(2) Date: Mar. 5, 2019

(87) PCT Pub. No.: WO2018/047246
PCT Pub. Date: Mar. 15, 2018

(65) Prior Publication Data
US 2021/0265133 A1    Aug. 26, 2021

(51) Int. Cl.
*G06K 19/06* (2006.01)
*G09F 19/18* (2006.01)

(52) U.S. Cl.
CPC ....... *G06K 19/06037* (2013.01); *G06K 19/06* (2013.01); *G09F 19/18* (2013.01)

(58) Field of Classification Search
None
See application file for complete search history.

(56) References Cited

U.S. PATENT DOCUMENTS 7,533,995 B2 *    5/2009    Momiuchi ............. G03B 21/00
                                                              353/62
7,766,485 B2 *    8/2010    Momiuchi ............. G09F 19/18
                                                              353/62
(Continued)

FOREIGN PATENT DOCUMENTS

JP        2004-259004 A    9/2004
JP           3650811 B2    5/2005
(Continued)

OTHER PUBLICATIONS

International Search Report dated Oct. 11, 2016 in PCT/JP2016/076216 filed Sep. 6, 2016.

*Primary Examiner* — Kristy A Haupt
(74) *Attorney, Agent, or Firm* — Oblon, McClelland, Maier & Neustadt, L.L.P.

(57) ABSTRACT

This invention relates to a visible image unit identification code structure using a spatial visible image forming device. A spatial visible image forming device is used that includes: a laser source that emits a laser beam in an invisible region; a scanning means that scans the laser beam; a condensing optical system that condenses the laser beam to a drawing scheduled point in a space so as to cause plasma emission of a gas; and a control means that controls oscillation timing of the laser source and scanning timing of the scanning means so as to generate the plasma emission at the drawing scheduled point in a time series and draw a visible image as an afterimage phenomenon of the plasma emission. A visible image unit identification code formed by combining and arranging multiple kinds of multiple visible image units in different states including different lightnesses/darknesses, colors or shapes or the like is displayed in a space such as in air or in other gases or in water, and information can be (Continued)

transmitted by reading the visible image unit identification code using a reading means from any direction.

20 Claims, 5 Drawing Sheets

(56) References Cited

U.S. PATENT DOCUMENTS

| | | | | |
|---|---|---|---|---|
| 2005/0068999 A1* | 3/2005 | Momiuchi | ............ | G03B 21/00 372/24 |
| 2009/0213340 A1* | 8/2009 | Momiuchi | ............ | G02B 30/56 353/62 |

FOREIGN PATENT DOCUMENTS

| | | | |
|---|---|---|---|
| JP | 2007-133639 A | | 5/2007 |
| JP | 2007133639 A | * | 5/2007 |
| JP | 2007-156969 A | | 6/2007 |
| JP | 2015-45932 A | | 3/2015 |
| JP | 5731059 B1 | | 6/2015 |

* cited by examiner

VISIBLE IMAGE UNIT IDENTIFICATION CODE STRUCTURE

TECHNICAL FIELD

The present invention relates to a visible image unit identification code structure in which an identification code formed of multiple visible image units is drawn in a space (in air, in water, in a gas, or the like) and can be simultaneously visually recognized by people in all directions or can be read using a reading device.

TECHNICAL BACKGROUND

Conventionally, a bar code and a QR code (registered trademark) have been known as identification codes. However, in these cases, information to be transmitted is fixed, and, in both cases, is printed on a piece of paper or on a hologram, or is planarly displayed on a display screen, and simultaneous recognition by people in all directions is not possible.

Further, a three-dimensional code or a virtual three-dimensional code has been disclosed in Japanese Patent Laid-Open Publication No. 2004-259004, Japanese Patent No. 5731059, Japanese Patent No. 5731061, and the like. However, similarly, information transmitted by an identification code cannot be changed, and simultaneous recognition by people in all directions is not possible.

On the other hand, the present inventors have made considerable achievements by proposing an aerial visible image forming device in Japanese Patent No. 3650811 and in U.S. Pat. Nos. 7,533,995 and 7,766,485 based on Japanese Patent No. 3650811.

Therefore, by using the above-mentioned areal visible image as an identification code, the identification code can be displayed in a space, and, by reading the identification code, information can be widely and reliably transmitted.

Patent Document 1: Japanese Patent Laid-Open Publication No. 2004-259004.
Patent Document 2: Japanese Patent No. 5731059.
Patent Document 3: Japanese Patent No. 5731061.
Patent Document 4: Japanese Patent No. 3650811.
Patent Document 5: U.S. Pat. No. 7,533,995.
Patent Document 6: U.S. Pat. No. 7,766,485.

DISCLOSURE OF THE INVENTION

Problems to be Solved by the Invention

A problem to be solved by the present invention is to provide a visible image unit identification code structure in which, by drawing multiple visible image units each including a spatial visible image in a space, an identification code formed of a combination of the visible image units is generated simultaneously or in a time series as real images, and can be simultaneously visually recognized from all directions or can be read using a reading device.

Means for Solving the Problems

In order to achieve the above object, the present invention provides a visible image unit identification code structure using a spatial visible image forming device that includes: a laser source that emits a laser beam in an invisible region; a scanning means that scans the laser beam; a condensing optical system that condenses the laser beam to a drawing scheduled point in a space so as to cause plasma emission of a gas; and a control means that controls oscillation timing of the laser source and scanning timing of the scanning means so as to generate the plasma emission at the drawing scheduled point in a time series and draw a visible image as an afterimage phenomenon of the plasma emission. A visible image unit identification code formed by combining and arranging multiple kinds of multiple visible image units in different states including different lightnesses/darknesses or colors is displayed in a space, and information can be transmitted by reading the visible image unit identification code using a reading means from any direction.

Effect of Invention

In the present invention, a visible image unit identification code formed by combining and arranging multiple kinds of multiple visible image units of different states, for example, different lightnesses/darknesses or colors or shapes is displayed in a space (in air, in water, in a gas, or the like). Therefore, the visible image unit identification code can be simultaneously read by people in any direction.

Therefore, the visible image unit identification code can also be used as a tool for transmitting information to moving bodies such as a drone, an aircraft, a ship, a train, an automobile, and other vehicles.

Further, the visible image unit identification code is expressed in a space as a combination of multiple kinds of visible image units of different states, and can also be expressed as a one-dimensional, two-dimensional or three-dimensional identification code.

Further, the visible image unit identification code can also change the combination of the states over time, and thus can increase the amount of information to be transmitted.

BRIEF DESCRIPTION OF DRAWINGS

FIGS. 1(*a*)-1(*d*) are explanatory diagrams illustrating states in which lighting of visible image units changes: FIG. 1(*a*) illustrates a state in which only a visible image unit at one end of a column is lighted; FIG. 1(*b*) illustrates a state in which an adjacent visible image unit is also lighted; FIG. 1(*c*) illustrates a state in which a further adjacent visible image unit is also lighted; and FIG. 1(*d*) illustrates a state in which all the visible image units are lighted.

FIG. 5(*a*) is a diagram in which a pattern of lighted and unlighted dots showing a visible image unit identification code of a plane A of FIG. 4 is shown on a display; FIG. 5(*b*) is a diagram in which a pattern of lighted and unlighted dots showing a visible image unit identification code of a plane B of FIG. 4 is shown on the display; and FIG. 5(*c*) is a diagram in which a pattern of lighted and unlighted dots showing a visible image unit identification code of a plane C of FIG. 4 is shown on the display.

DESCRIPTION OF REFERENCE NUMERALS

1: spatial visible image forming device
2: visible image unit
2a: visible image unit as a reference for reading
3: visible image unit identification code
4: reading device
5: camera
6: display
7: memory
8: pattern of lighted and unlighted dots
10: moving body
11: communication function
20: lighted visible image unit
21: unlighted visible image unit

BEST MODE FOR CARRYING OUT THE INVENTION

In the following, preferred embodiments of the present invention are described with reference to the drawings.

A spatial visible image forming device 1 conforms to a structure of an aerial visible image forming device disclosed in the above-mentioned Japanese Patent No. 3650811 (U.S. Pat. Nos. 7,533,995 and 7,766,485), and is also applied to visible image formation in water.

Embodiment 1

The spatial visible image forming device 1 includes a laser source that emits a laser beam in an invisible region, a scanning means that scans the laser beam, a condensing optical system that condenses the laser beam to a drawing scheduled point in air or in water so as to cause plasma emission of a gas, and a control means that controls oscillation timing of the laser source and scanning timing of the scanning means so as to generate the plasma emission at the drawing scheduled point in a time series and draw a visible image as an afterimage phenomenon of the plasma emission, and, since a structure described in Japanese Patent No. 3650811 is incorporated herein by reference, a detailed description thereof is omitted.

The spatial visible image forming device 1 can be provided at a fixed position, or on a moving body or the like, and can form a visible image unit identification code 3 in which multiple visible image units 2 having the same shape are combined in a space.

In the present embodiment, as an example, the visible image units 2 are each formed of a dot-shaped visible image, and a combination of two kinds of visible image units 2 (20, 21) including light and dark, that is, lighted (including blinking, the same applies in the following) and unlighted visible image units 2 as visible image units 2 in different states is used as the visible image unit identification code 3.

For example, using a lighted visible image unit 20 as "1" and an unlighted visible image unit 21 as "0," the visible image unit identification code 3 can be expressed in binary notation or by a pattern of lighted and unlighted dots.

The visible image unit identification code 3 is formed of a combination of multiple visible image units 2 (20, 21) arranged in a row or column direction or multiple visible image units 2 (20, 21) arranged in a matrix form, and information is read from lighting or blinking, or unlighting expressed by each of the visible image units or from a pattern of dot shapes formed by combined multiple visible image units.

The visible image unit identification code 3 may be formed by simultaneously drawing multiple visible image units 2 (20, 21) in a space, or may be formed by regularly and sequentially drawing one or several visible image units 2 in a space.

When the visible image unit identification code 3 is formed by arranging visible image units 2 only in a row or column direction in a straight line, in order to determine whether or not a visible image unit 2 is lighted (20) or unlighted (21), four or more visible image units 2 are preferably arranged.

For an unlighted visible image unit 2 (21), whether or not there is an unlighted visible image unit 2 (21) between a pair of lighted visible image units 2 (20) is determined from a left-right or up-down direction interval based on lighted visible image units 2 (20).

Therefore, when three or less visible image units 2 are arranged, when any one of the visible image units is unlighted, it is difficult to determine that the one of the visible image units is unlighted.

However, even in such a case, for example, by sequentially lighting the visible image units from one end toward the other end of a row or column with predetermined time differences, a left-right or up-down direction can be indicated.

Figure 1:
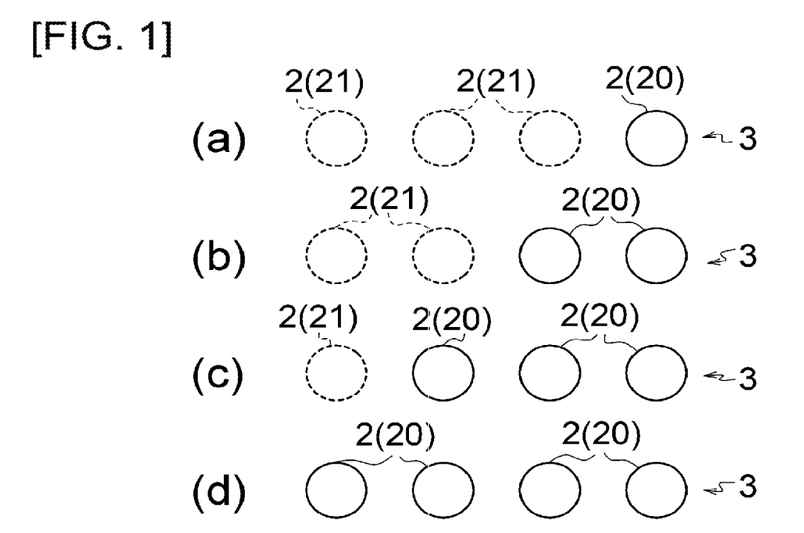

In FIG. 1, four visible image units 2 are set to be arranged in one column in the column direction. First, only a visible image unit 2 (20) at a right end in the figure is lighted and the other visible image units 2 (21) are unlighted (see FIG. 1 (a)).

Then, sequentially, toward a left side, adjacent visible image units 2 change one by one to lighted visible image units 2 (20) (see FIGS. 1(b)-1(d)).

The visible image unit identification code 3 in this case can indicate a direction that is the same as seen from all directions regardless of a direction in which an observer observes the visible image unit identification code 3, and thus, for example, can be used as a direction indication code for indicating a traveling direction of a traveling body such as an automobile, or guiding a traveling direction of a traveling body, or the like.

Here, a reading device 4 is not necessary, and an observer can intuitively recognize the meaning of the visible image unit identification code 3.

Embodiment 2

Figure 2:
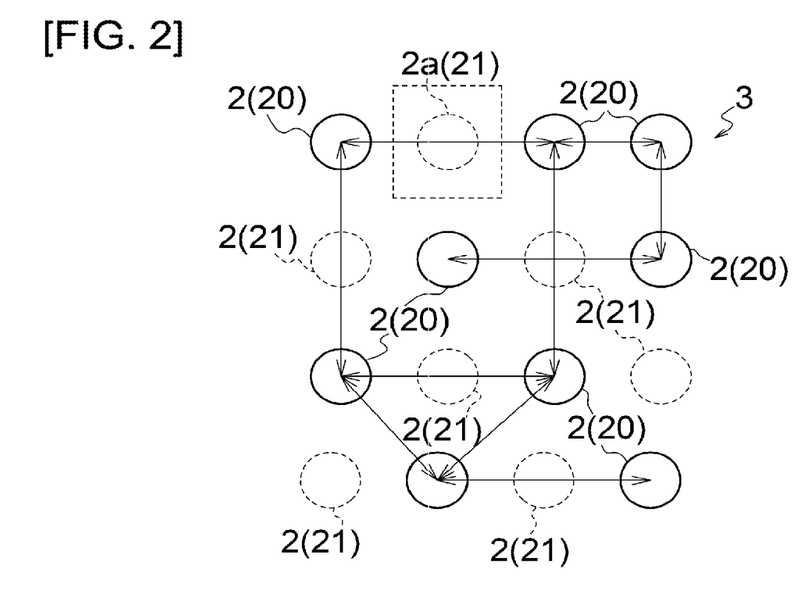
FIG. 2 is a front view illustrating a two-dimensional visible image unit identification code formed of multiple visible image units arranged in a matrix.

In a two-dimensional visible image unit identification code 3 of which an example is illustrated in FIG. 2, when arrays of the visible image units 2 of the visible image unit identification code 3 in a longitudinal direction and in a lateral direction are determined in advance to have predetermined intervals, lengths of intervals are measured based on lighted visible image units 2 (20) from intervals between visible image units 2 (20) adjacent to each other in up-down or left-right directions. When a difference between a long interval and a short interval is substantially a multiple of the short interval, it can be inferred that there is an unlighted visible image unit 2 (21) between the lighted visible image units 2 (20). When a unlighted length at the sort interval is a length that is substantially a multiple of a short interval, it can be inferred that there is an unlighted visible image unit 2 (21) between the lighted visible image units 2 (20). The visible image unit identification code 3 can be determined by supplementing existence of unlighted visible image units 2 (21).

Next, for a pattern in a matrix shape formed of a combination of lighted or unlighted visible image units 2 (20, 21), a left-right (column) arrangement of unlighted visible image units 2 (21) is different depending on a direction in which the visible image unit identification code 3 is viewed. Therefore, a visible image unit at a predetermined position is set in advance as a designated visible image unit 2a so as to be a reference of the visible image unit identification code 3 viewed from a front side, and, in the present embodiment, the visible image unit 2a is set to be unlighted.

The designated visible image unit 2a may be unlighted or lighted, or may be a visible image unit having a color or shape different from other visible image units.

When the visible image unit 2 of the second column from the left of the first row of the visible image unit identification code 3 is set to be unlighted as the designated visible image unit 2a (21a) which is the reference for reading and the visible image unit 2 (20) of the second column from the right of the first row is set to be lighted, a person observing the visible image unit identification code 3 or the reading device 4 (to be described later) can determine from which direction the visible image unit identification code 3 is to be read and can determine the front side.

In this case, in order to clearly indicate the unlighted designated visible image unit 2a (21a), visible image units 2 adjacent to the visible image unit 2a may be set to be lighted.

Then, when the direction in which the visible image unit identification code 3 is read is determined, the visible image unit identification code 3 visible from an observing position is read as it is or by being rotated or inverted.

In this way, by reading the visible image unit identification code 3 in a direction of the front side, the same visible image unit identification code 3 can be simultaneously correctly read in all directions.

Figure 3:
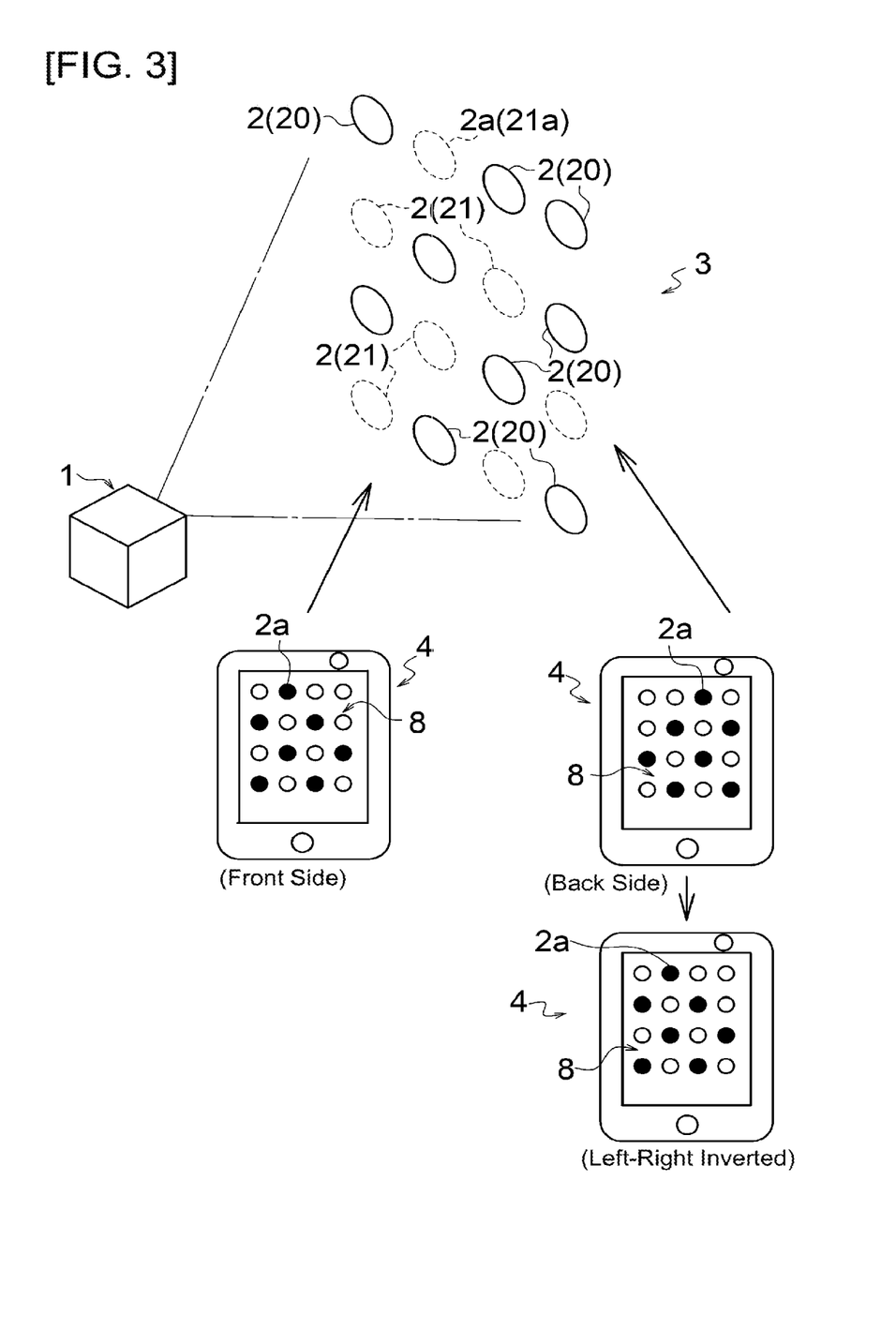
FIG. 3 illustrates patterns of lighted and unlighted dots displayed on a reading device when images of the visible image unit identification code of FIG. 2 are captured by the reading device in different directions.

FIG. 3 is an example in which the visible image unit identification code 3 is observed from the front side and the back side. Observation data of the back side is left-right inverted and thereby matches with observation data of the front side, and the visible image unit identification code 3 can be correctly read.

Embodiment 3

Figure 4:
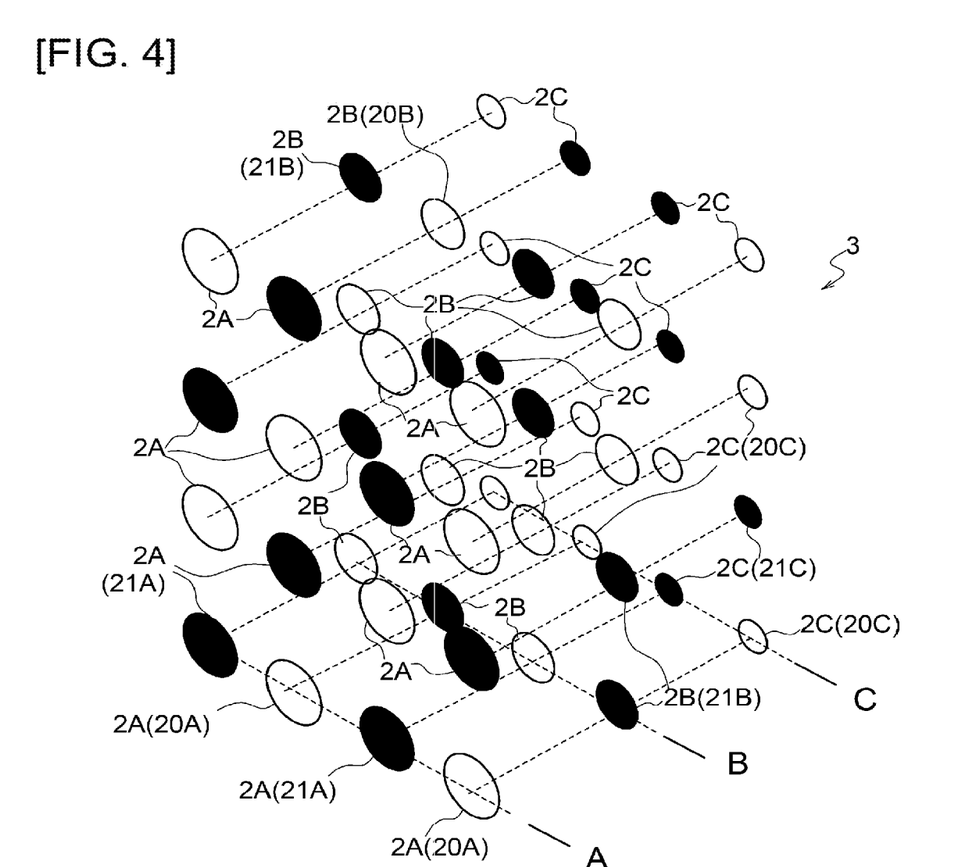
FIG. 4 is a perspective view of a three-dimensional visible image unit identification code.

The visible image unit identification code 3 can increase the amount of information as a three-dimensional identification code by increasing planes in a depth direction in a space and similarly arranging visible image units 2 on the increased planes (see FIG. 4).

Also in this case, in order to distinguish between the front side and the back side, the visible image unit 2a (21a) which is a reference for reading is preferably unlighted.

Further, in the three-dimensional visible image unit identification code 3, in order to distinguish the multiple planes in the depth direction, for example, for a plane on a deeper side in the depth direction, dots of the visible image units 2 are formed smaller, and the visible image units 2 arranged on the planes are distinguished based on the sizes of the dots, or, the visible image units 2 (20) on each plane in the depth direction may be formed of the same color, and the visible image units 2 (21) included in different planes may be distinguished from each other by applying different colors.

In the three-dimensional visible image unit identification code 3 of which an example is illustrated in FIG. 4, three planes A, B, C are set in the depth direction. 4 rows and 4 columns of visible image units 2 are arranged on each plane. The visible image units 2A (20A, 21A) on the plane A on the front side are each formed of a dot of a large diameter. The visible image units 2B (20B, 21B) on the plane B in the middle are each formed of a dot of a medium diameter. The visible image units 2C (20C, 21C) on the plane C on the deepest side are each formed of a dot of a small diameter. On which plane a visible image unit is included can be known based on the size of the dot.

Figure 5:
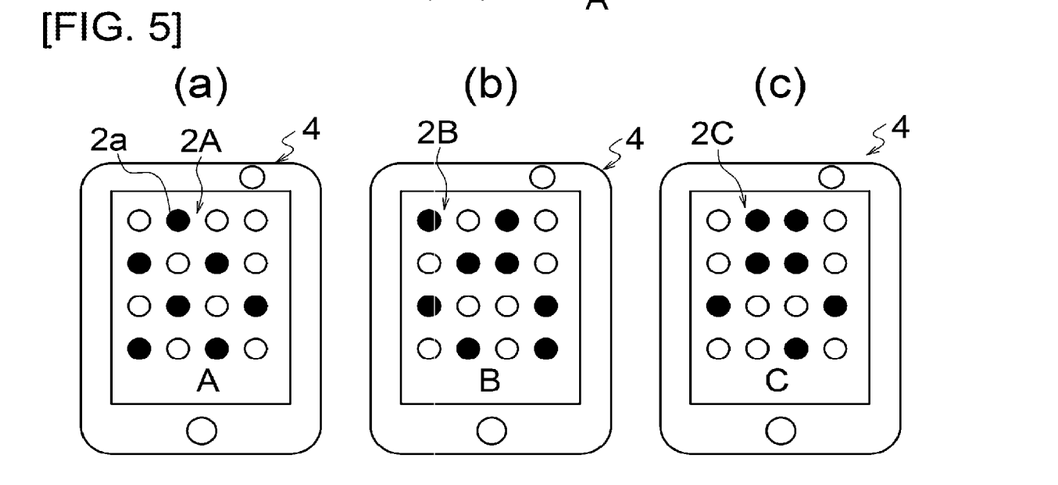

FIGS. 5(a)-5(c) are respectively combinations of the visible image units 2 on the planes of the visible image unit identification code 3 displayed by the reading device 4, and information can be read by combining these as the three-dimensional visible image unit identification code 3.

Or, it is also possible that predetermined visible image units 2 indicating reference positions of the planes (A-C) are lighted or blinked, and thereby, based on these visible image units 2, visible image units 2 included in the same plane are determined.

The above is a case where the combination of the multiple visible image units 2 is three-dimensionally substantially simultaneously expressed in a space. However, it is also possible that a two-dimensional combination of visible image units 2 is changed with predetermined time differences and is expressed like a three-dimensional combination.

Similarly, it is also possible that a three-dimensional visible image unit identification code 3 is changed with time differences and is expressed like a four-dimensional visible image unit identification code 3 (not illustrated in the drawings).

As a result, a combination of a large number of visible image units 2 can be provided with information as the visible image unit identification code 3.

Further, it is also possible that, in the same space where the visible image unit identification code 3 is expressed, different visible image unit identification codes 3 are expressed with time differences and information to be transmitted is changed with time.

As a reading means of the visible image unit identification code 3, when the visible image unit identification code 3 is a simple combination of the visible image units 2, the visible image unit identification code 3 can be visually read by an observing person without using a device.

As described above, in the case of the visible image unit identification code 3 in which lighting or blinking of the visible image units changes so as to indicate a traveling direction of a traveling body such as an automobile, operators of surrounding traveling bodies, or surrounding people, can visually recognize the traveling direction of a traveling body without using a portable terminal.

Embodiment 4

Next, a case where the reading device 4 is used as the reading means of the visible image unit identification code 3 is described.

Figure 6:
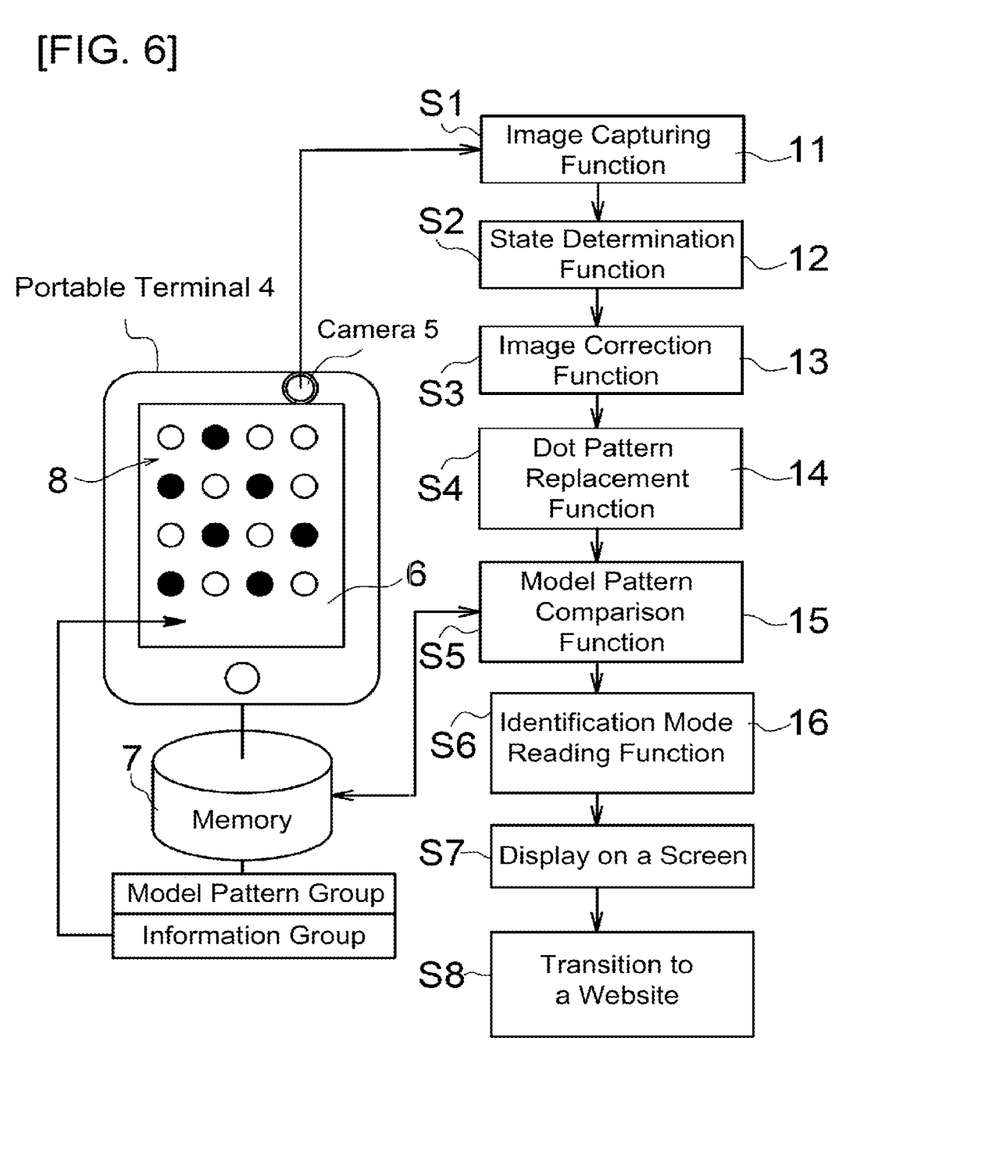
FIG. 6 is a block diagram illustrating a reading function of the reading device.

As the reading device 4 illustrated in FIG. 6, a portable terminal having a computer structure having a camera 5, a display 6 and a memory 7, for example, a commonly known device such as a smartphone, can be used.

In the portable terminal which illustrates an example of the reading device 4, software for reading the visible image unit identification code 3 is installed.

As illustrated in FIG. 6, first, at Step 1 (S1), by an image capturing function 11, the software captures an image of the visible image unit identification code 3 in the air with the camera 5.

Next, at Step 2 (S2), by a state determination function 12, the states of the visible image units are determined. In the present embodiment, from the captured image data, unlighted visible image units 2 (21) are determined based on lighted visible image units 2 (20).

Next, at Step 3 (S3), by an image correction function 13, the image is corrected to an image viewed from the front side by rotating the image corresponding to a direction in which the image of the visible image unit identification code 3 is captured.

Then, at Step 4 (S4), by a dot pattern replacement function 14, the visible image units 2 of the visible image unit identification code 3 of the image are replaced with a schematic pattern 8 of lighted and unlighted dots, which is displayed on the display 6 of the reading device 4.

At Step 5 (S5), by a model pattern comparison function 15, the pattern 8 of lighted and unlighted dots is compared with a group of model patterns of dots stored in advance in the memory 7 and a matching model pattern formed of a combination of lighted and unlighted dots is identified.

Then, at Step 6 (S6), by an identification mode reading function 16, information associated with the identified model pattern is called from an information group, and is displayed on the display 6 at Step 7 (S7).

The information displayed on the display 6 may be text information or a hyperlink of an address of a predetermined site, and in the latter case, transition to a predetermined website is performed at Step 8 (S8).

When the visible image unit identification code 3 changes at certain time intervals, a moving image thereof is recorded using a moving image capturing function of the camera 5 of the reading device 4. The moving image data is processed as it is or is converted to a combination of still images continuous at certain intervals and processed. In the following, similar to the above-described procedures, the image may be corrected and may be converted to a pattern 8 of lighted and unlighted dots and a matching model pattern of lighted and unlighted dots may be determined.

In the present embodiment, only an identification mark of a visible image unit is exemplified. However, in the visible image unit identification code, any marks such as a straight line, a curve, and any geometrical shape may be used in combination.

Further, in the above embodiments, the case where only the multiple visible image units are used is exemplified. However, a sound may be combined therewith, and an audio signal may be an alarm function or may be supplementarily used as a part of the identification code.

In this case, the audio signal may be simultaneously recorded with the image by a microphone function (not illustrated in the drawings) of the reading device 4, and information of the audio signal may be similarly analyzed by comparing the audio signal with an audio signal group stored in the memory.

As described above, the visible image unit identification code 3 formed of a combination of the visible image units 2 is not limited to a visible image unit identification code 3 displayed in the air, but may be used in water, in any gas or the like as long as it is a place where the visible image unit identification code 3 can be displayed by the spatial visible image forming device, and can also be widely used for moving bodies such as an underwater diver, a submarine, a remote control underwater drone, a flying drone, a traveling robot, and others.

Embodiment 5

Figure 7:
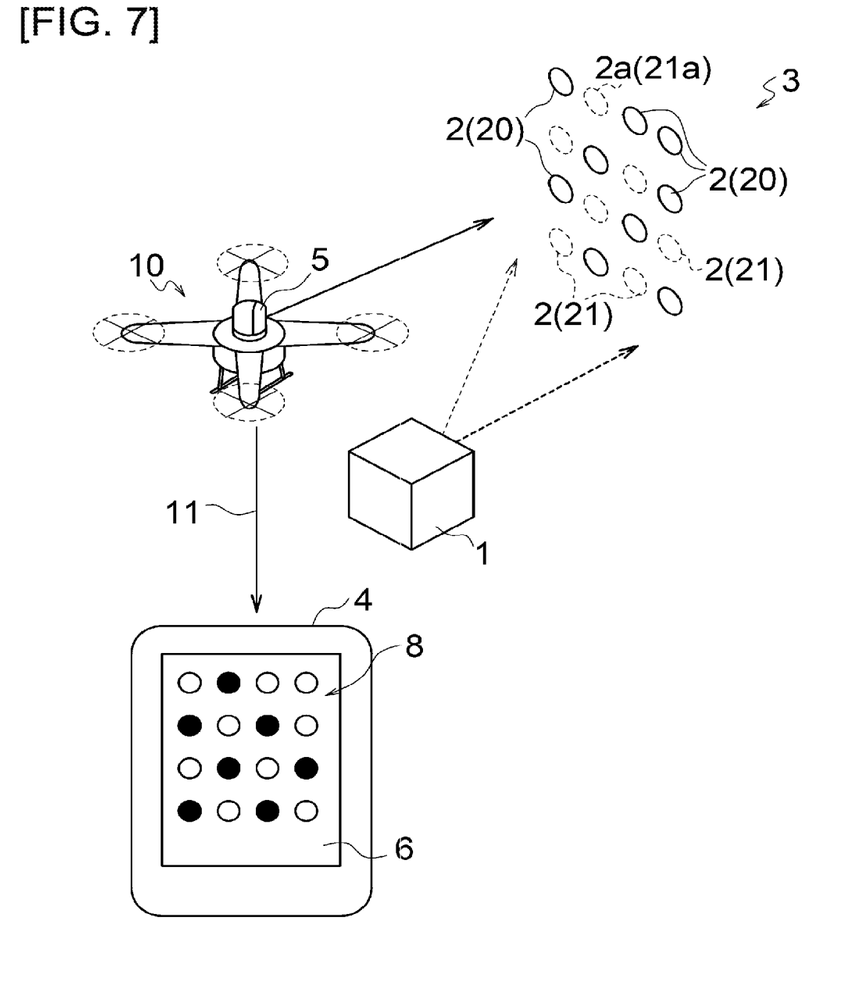
FIG. 7 is an explanatory diagram of a state in which a camera is mounted on a drone separately from the reading device.

When a moving body 10 such as a drone is remotely operated, as illustrated in FIG. 7, the camera 5 is provided on the moving body 10, and captured image data is transmitted to the reading device 4 of an operator or an administrator via a communication function, and, based on the transmitted image data, information can be read by the reading device 4 according to the reading procedures illustrated in FIG. 6.

In this case, since the camera 5 is provided on the moving body 10, the reading device 4 is not required to have a camera.

Further, lighting as a state of "light" of a visible image unit also includes a blinking state.

In the present invention, as visible image units of different states, in addition to different lightnesses/darknesses, visible image units of different colors, for example, two different colors including blue and red, can also be used.

For example, as the visible image unit identification code, red visible image units may be used instead of the lighted or blinking visible image units and blue visible image units may be used instead of the unlighted visible image units.

In this case, the visible image unit identification code can be read according to the above embodiments, and thus, a description thereof is omitted.

Further, the shapes of the visible image units may be different. For example, as the visible image unit identification code, circular visible image units may be used instead of the lighted or blinking visible image units and triangular visible image units may be used instead of the unlighted visible image units.

Also in this case, the visible image unit identification code can be read according to the above embodiments, and thus, a description thereof is omitted.

Further, the kinds of the visible image units of different states are not limited to two kinds, and may be three or more kinds.

In addition, the present invention is not limited to the above embodiments, and various design changes can be made within the scope without changing the spirit of the present invention.

The invention claimed is:

1. A visible image unit identification code structure using a spatial visible image forming device, comprising:
    a laser source that emits a laser beam in an invisible region;
    a scanning device that scans the laser beam;
    a condensing optical system that condenses the laser beam to a drawing scheduled point in a space so as to cause plasma emission of a gas; and
    a control device that controls oscillation timing of the laser source and scanning timing of the scanning device so as to generate the plasma emission at the drawing scheduled point in a time series and draw a visible image as an afterimage phenomenon of the plasma emission,
    wherein a visible image unit identification code formed by combining and arranging multiple kinds of multiple visible image units in different states including different lightnesses/darknesses or colors is displayed in a space, and information can be transmitted by reading the visible image unit identification code using a reading device from any direction.

2. The visible image unit identification code structure according to claim 1, wherein the visible image units are each formed in a dot-like shape.

3. The visible image unit identification code structure according to claim 2, wherein the visible image units include visible image units in two different states: lighted or blinking and unlighted.

4. The visible image unit identification code structure according to claim 2, wherein the visible image units include visible image units in multiple different states with different colors.

5. The visible image unit identification code structure according to claim 2, wherein the visible image unit identification code includes one-dimensional, two-dimensional or three-dimensional visible image units.

6. The visible image unit identification code structure according to claim 2, wherein the visible image unit identification code can display multiple different pieces of information in a time series by changing states of all or some of the visible image units over time.

7. The visible image unit identification code structure according to claim 2, wherein display of a state of a visible image unit arranged at a predetermined position in the visible image unit identification code is an instruction mark that allows whether or not the visible image unit identification code is viewed from a front side to be identified.

8. The visible image unit identification code structure according to claim 7, wherein the visible image unit as the instruction mark is a lighted or blinking visible image unit and is in a color different from the other visible image units.

9. The visible image unit identification code structure according to claim 2, wherein the visible image unit identification code is formed of a combination of multiple visible image units arranged in a matrix.

10. The visible image unit identification code structure according to claim 2, wherein a predetermined sound is emitted corresponding to the information of the visible image unit identification code.

11. The visible image unit identification code structure according to claim 1, wherein the visible image units include visible image units in two different states: lighted or blinking and unlighted.

12. The visible image unit identification code structure according to claim 1, wherein the visible image units include visible image units in multiple different states with different colors.

13. The visible image unit identification code structure according to claim 1, wherein the visible image unit identification code includes one-dimensional, two-dimensional or three-dimensional visible image units.

14. The visible image unit identification code structure according to claim 1, wherein the visible image unit identification code can display multiple different pieces of information in a time series by changing states of all or some of the visible image units over time.

15. The visible image unit identification code structure according to claim 1, wherein display of a state of a visible image unit arranged at a predetermined position in the visible image unit identification code is an instruction mark that allows whether or not the visible image unit identification code is viewed from a front side to be identified.

16. The visible image unit identification code structure according to claim 15, wherein the visible image unit as the instruction mark is a lighted or blinking visible image unit and is in a color different from the other visible image units.

17. The visible image unit identification code structure according to claim 1, wherein the visible image unit identification code is formed of a combination of multiple visible image units arranged in a matrix.

18. The visible image unit identification code structure according to claim 1, wherein a predetermined sound is emitted corresponding to the information of the visible image unit identification code.

19. The visible image unit identification code structure according to claim 1, wherein the reading device includes a reading device, and the reading device has an image capturing function that captures an image of the visible image unit identification code, an unlighting determination function that determines visible image units in different states, an image correction function that corrects a captured image of the visible image unit identification code to an image viewed from a front side, a dot pattern replacement function that replaces the corrected image with a pattern of dots in different states, a registered pattern comparison function that performs a comparison with a group of model patterns stored in a memory to identify a matching model pattern, and an information calling device that calls information associated with an identified model pattern from a memory and externally displays the information on a display of the reading device.

20. The visible image unit identification code structure according to claim 19, wherein the image capturing function is mounted on a traveling body, an image of the visible image unit identification code captured by the image capturing function is transmitted by a communication device to the reading device at a position away from the traveling body, and processing is performed at the reading device based on the received image of the visible image unit identification code.

* * * * *